United States Patent [19]
Kazemzadeh

[11] Patent Number: 5,894,027
[45] Date of Patent: Apr. 13, 1999

[54] MILK AND PROTEIN POWDER-COATED CEREAL PRODUCTS

[75] Inventor: Massoud Kazemzadeh, Bloomington, Minn.

[73] Assignee: MJM Technologies, L.L.P., Stacy, Minn.

[21] Appl. No.: 08/946,318

[22] Filed: Oct. 7, 1997

Related U.S. Application Data

[60] Provisional application No. 60/028,020, Oct. 9, 1996.
[51] Int. Cl.$^6$ .......................... A21D 13/00; A21L 1/216; A23L 1/164
[52] U.S. Cl. ................... 426/94; 426/289; 426/290; 426/293; 426/303; 426/620; 426/621
[58] Field of Search ...................... 426/93, 94, 96, 426/289, 290, 293, 302, 303, 620, 621

[56] References Cited

U.S. PATENT DOCUMENTS

| | | |
|---|---|---|
| 3,557,718 | 1/1971 | Chivers . |
| 3,615,647 | 10/1971 | Kassens . |
| 3,615,655 | 10/1971 | Freeman et al. . |
| 3,615,676 | 10/1971 | KcKown et al. . |
| 3,723,131 | 3/1973 | Bixby et al. . |
| 3,764,715 | 10/1973 | Henthorn et al. . |
| 3,814,822 | 6/1974 | Henthorn et al. . |
| 3,873,748 | 3/1975 | Schwab et al. . |
| 3,955,000 | 5/1976 | Baggerly . |
| 3,959,498 | 5/1976 | Lyall et al. . |
| 3,976,793 | 8/1976 | Olson et al. . |
| 4,038,427 | 7/1977 | Martin . |
| 4,061,790 | 12/1977 | Cole, Jr. . |
| 4,079,151 | 3/1978 | Schade et al. . |
| 4,089,984 | 5/1978 | Gilbertson . |
| 4,097,613 | 6/1978 | DeLauder et al. . |
| 4,101,680 | 7/1978 | Edwards . |
| 4,140,803 | 2/1979 | Panchuk et al. . |
| 4,180,594 | 12/1979 | Graf .................................. 426/560 |
| 4,338,339 | 7/1982 | Edwards . |
| 4,379,171 | 4/1983 | Furda et al. . |
| 4,409,250 | 10/1983 | Van Hulle et al. . |
| 4,501,759 | 2/1985 | Gajewski . |
| 4,702,925 | 10/1987 | Verrico . |
| 4,755,390 | 7/1988 | Calandro et al. . |
| 4,756,920 | 7/1988 | Willard . |
| 4,822,626 | 4/1989 | Spanier et al. . |
| 4,853,235 | 8/1989 | Tomomatsu . |
| 4,876,101 | 10/1989 | Willard . |
| 4,880,645 | 11/1989 | Carpenter et al. . |
| 4,961,943 | 10/1990 | Blanthorn et al. . |
| 5,019,403 | 5/1991 | Krochta . |
| 5,188,860 | 2/1993 | Hemann et al. . |
| 5,196,219 | 3/1993 | Hsu . |
| 5,372,826 | 12/1994 | Holtz et al. . |
| 5,413,805 | 5/1995 | Delpierre . |
| 5,532,010 | 7/1996 | Sparier et al. . |

FOREIGN PATENT DOCUMENTS

217409 A2  10/1985  European Pat. Off. .

*Primary Examiner*—Nina Bhat
*Attorney, Agent, or Firm*—Merchant, Gould, Smith, Edell, Welter & Schmidt, P.A.

[57] ABSTRACT

Breakfast cereal products coated with a cold-water-soluble coating made from milk solids or high protein, vitamins, and mineral supplement powders adhering to the surface of the cereal via an adhesive or conditions making the surface of the cereal adherent are described. The cereal itself may contain in its basic recipe milk solids, fibers, sugars, fats and carbohydrates, various proteins and minerals, thus classifying the basic cereal formula as a high energy and/or high protein and/or high fiber cereal product, which may be fortified with other essential minerals and vitamins used commonly as dietary supplements. This product is processed in a manner so that a coating is applied composed of such products which remain soluble in cold water at the time of consumption, even after drying and eliminates the need for liquid milk requiring only tap water to generate a similar taste, color, and texture, as well as mouth sensation, at the time of consumption of the cereal.

12 Claims, No Drawings

MILK AND PROTEIN POWDER-COATED CEREAL PRODUCTS

This application claims benefit under 35 U.S.C. 119 (e) of Provisional Application 60/028,020 filed Oct. 9, 1996.

BACKGROUND OF THE INVENTION

Breakfast cereals are a major component of the western daily diet. It is a $13 billion per year market in the U.S. (projected for 1996) and has been one of the fastest growing segments of the food industry in Europe and some developing countries. Most cultures appreciate the taste and the texture, as well as the nutritional value, which is imparted by such foods. However, in many cases of developing countries, as well as in some of the specialty markets such as the Armed Forces, there is no easy access to liquid milk. Due to this lack of availability of milk, as well as other considerations, such as some groups' intolerance to lactose coupled with the impossibility in some developing countries of obtaining and storing liquid milk at all times within the household, or at the place of consumption, the consumption of the cereal is avoided and sometimes diminished to non-existence.

SUMMARY OF THE INVENTION

This invention provides for milk solids with appropriate whitening ingredients, either soya-based or from milk or other high protein sources, which are prepared and affixed to the surface of the cereal such that the particulate does not release moisture to the starch-based cereal grain, nor does it cause migration of moisture or fats from its surface to the adjacent starch or sugar-based cereal pieces. This coating may contain other sources of nutrients, such as sugars and fibers and carbohydrates, as well as modified and hydrolyzed proteins, hydrolyzed carbohydrates, fibers, and the like to provide a stable coating yielding the required texture, color, taste and mouthfeel to mimic the appearance and taste of having milk with cereal when cold water is added to the coated cereal. The purpose of the invention is to make eating of cereals more frequent, as well as more efficient for the consumer, so that its consumption is not dependent on any other ingredients outside of the package except tap water. This will make the consumption and marketing of such cereals in developing countries, as well as the Armed Forces, more realistic and in line with the spirit of world-wide human development.

This invention utilizes protein sources from other ingredients or cereal grains, such as gluten from wheat protein and soya protein, as well as egg proteins and casein of milk proteins within the starch based cereal recipe, so that the end result will be crunchier pieces which are also more stable to moisture migration. By combining both the high proteins in the cereal recipe, along with the cold-water soluble coating having the taste of milk combined with vitamins and minerals, the end product is a breakfast cereal which is stable within a packaging system and the surface of which solubilizes upon mixing the cereal with cold or warm water. The consumer then will be able to eat such product anywhere he or she can find water, thus making it also a good source of baby food for weaning children if the particulate of the cereal is ground before preparation.

The unique nature of this product is that the cereal pieces, whether flakes, crispy rice, O's, or any other form, if it contains a higher level of protein within the main recipe, will carry a higher initial crunch texture than common cereals, as well as having a longer bowl life in cold water, thus making the consumption of the cereal more attractive and highly beneficial for the consumer.

Accordingly, the present invention is a coated cereal product including a dry cereal having a coating; said coating including: an effective amount of a water soluble adhesive, and an effective amount of a water soluble powder derived from milk powder, powdered soya milk, protein sources and mixtures thereof, wherein the coated cereal product mimics the appearance and taste of milk with cereal when cold water is added thereto, and wherein the coated product provides a complete nutritional balance on consumption.

DETAILED DESCRIPTION

It was difficult until now to achieve the above desired characteristics within a cereal system, due to low water content and low water activity present in common cereals. Because of this, any coating added to the surface had to be in a slurry form, or an adhesive such as water or oil was added to maintain the coating until it was dried for a second time and reduced the water activity of the total cereal to a shelf-stable condition. We have found that by preferably starting with high protein cereal (12% and up) within the initial recipe, the cereal particulates are more resistant to water activity, and thus do not readily absorb moisture from the surroundings. This allows the cereal to be sprayed with a water soluble adhesive such as carboxyl methyl cellulose (CMC), or various gums and hydrocolloids, such as guar gum, xanthan, gum arabic, etc. either in a slurry form containing water and part or all of the coating compound, or by coating the surface of the cereal piece followed by powdering the sticky surface with the coating compound. The adhesive preferably has a water activity of less than 0.75 and is applied hot. This allows the water activity at the surface of the cereal to remain at lower values, thus allowing the adhesive to be dried slowly at low temperatures without changing the characteristics of the components of the surface coating (such as denaturation of the proteins) until the cereal is totally dried at low temperatures to the desired and stable condition. The lower water activity within the slurry that carries the solids containing the various components of the coating is due to the matrix formed by the various gums and hydrocolloids affixed to the surface of the cereal, thus releasing the water to higher temperature air during drying rather than to the cereal base.

I have also found that sugars and syrups are preferred as adhesives in complying with the above required conditions. The sugars or syrups are applied in a slurry by a hot spray method onto the dried cereal. Particularly useful are corn syrup or molasses. The powdered coating is then added onto the adhesive.

The drying technique of such cereals is also important in the protection of the solubility of the protein coating in water. If the temperature of the drying is not considered and is at high settings (beyond 185° F.), then the effect on the insolubility of the proteins becomes greater, causing insolubility within the water medium during consumption. The total water activity of the cereal and the coating at the time of packaging should be below 5.2. Under this condition, the total water content of the coated piece, i.e. product, may be within 2–8%. This level of water within the cereal mandates that, after the production of the cereal, it needs to be dried or even toasted to keep the water content of the system at very low levels so that when the coating is introduced to the surface, the remaining drying which is being conducted will remove the moisture from the surface of the cereal and exclusively from the coated material. This step allows the coating to adhere to the surface of the cereal very tightly, and only to be released when the moisture is introduced at high levels.

If care is not taken to coat and dry the cereal as outlined in the above steps and conditions, the resulting product will end up in a soggy condition after it is packaged, and the migration and release of the moisture, either within the cereal itself or from the coating to the cereal, will become apparent and affect the texture of the final product.

Processing techniques for manufacturing breakfast cereals are well known. The purpose of the present description is to specify the unique manner whereby the recipe of the cereal being manufactured using, for example, an extrusion system, incorporates proteins, carbohydrates, sugars, fats, and fibers from various sources, such as from legumes (for example soya, peanuts, sweet peas, and the like) or cereals such as wheat, corn, barley, rice, oat, and the like, or tubers such as potatoes, or any other types of proteins, may be applied to this product and not mentioned in the above listing or the modification of the above ingredients whether chemically, mechanically, thermally or electromagnetically. The cereal is produced with specific formulations incorporating one or more of the above sources with proteins from 1–28%, sugars from 1–20%, carbohydrates from 30–85%, fats from 0.5–8%, fibers from 0.5–16% and other matter modified or hydrolyzed from any of the above sources at ranges from 0–65% by dry weight basis. Optionally, liquids made of fats, oils and other hydrophobic materials may be applied to isolate the cereal from the surface coating of a cold-water soluble coating. The cereal is then toasted and/or dried to moistures of less than 5% by weight. An adhesive such as maltodextrin, or gum solutions, or any compound or compounds possessing adhesive characteristics and having a low water activity of approximately 0.75 or less is then added to the surface of the dried or toasted cereal. The cereal surface can be further toasted and dried, followed by application of the cold-water soluble powder or slurry derived from various sources such as powdered soya milk, milk powder, or a mixture of various protein sources, emulsifiers, and/or whiteners possessing liquid-milk-mimicking characteristics when water is added. The cereal is then further dried with high volume air flowing dryers at low temperatures of 130°–195° F. The final product is then packaged after it has reached room temperature.

Alternatively a slurry containing adhesive and the water soluble powder may be spray coated on the dried or toasted cereal.

The type of protein and other cold-water soluble compounds applied to the surface may be chosen from types of ingredients that do not change the solubility of the coating ingredient powder when it is subjected to the final drying temperatures cited above. The ingredients for such a coating, including whiteners, may include some or all of the following: sodium caseinate, partially hydrogenated soybean oil, corn syrup solids, dipotassium phosphate, mono- and diglycerides, lecithin, soy protein isolate, cocoa powder, dried honey, powdered almond butter, pectin, bran (corn, soya, rice, etc.), soya flour, maltodextrin, skim milk powder, cellulose gel, non-fat dry milk, sucrose, dextrose, sodium triphosphate, calcium casemate, modified corn starch, carageenan, artificial or natural flavors, fructose, gum arabic, egg white. Thickening agents may also be added to the surface coating so that, at the time of consumption with water, the coating forms a slightly thicker consistency than water, thus giving the mouth-feel and the texture of milk and cereal. Minerals and vitamins combined with the coating may include calcium carbonate, magnesium phosphate, potassium chloride, calcium phosphate, sodium ascorbate, vitamin E acetate, niacinamide, zinc sulfate, calcium pantothenate, ferrous sulfate, beta carotene, vitamin A palmitate, magnesium sulfate, copper gluconate, pyridoxine, hydrochloride, riboflavin, thiamine hydrochloride, folic acid, biotin, sodium molybdate, potassium iodine, chromium chloride, sodium selenite, phylloquinone (vitamin K1), vitamin B12 (cyanocobalamin), vitamin D3 (cholecalciferol), vitamin B6, thiamine mononitrate, folic acid, riboflavin, calcium succinate, zinc oxide, and zinc gluconate. This surface coating can also be composed of whole or partial soya milk powder, other proteins from non-dairy sources, vitamins and minerals and appropriate whiteners, coloring agent and adhering compound to produce a cereal with soya milk for those who are lactose intolerant.

Particularly useful surface coating powders are those which are commercially available pre-formulated high protein, milk or milk-substitute powders such as for example: Super MEGAMASS® 2000 from Weider Nutrition Group, Salt Lake City, Utah; SIMILAC® powdered formulas, e.g. Low-Iron Infant Formula, from Ross Products Division, Abbott Laboratories, Columbus, Ohio; ULTRA SLIM FAST® in a variety of flavors, e.g. Cafe Mocha, from Slim●Fast Food Company, West Palm Beach, Fl.; and ENFAMIL® products, e.g. Next Step™, from Mead Johnson Nutritionals, Evansville, Ind.

The surface coating may have to be reapplied a number of times in order to accumulate enough water-soluble powder so that, when water is added, the product will have the appearance of liquid-milk-containing cereal.

The recipe for the powder coating can be formulated in such a manner as to be considered full-fat, low-fat, and no-fat to result in a cereal with a milk-like coating which is full-, low-, or no-fat in content.

Such products, with the appropriate coatings and being nutritionally balanced, are formulated in such manner that if the product is fine ground after final drying, it can be consumed in a porridge or liquid drink by the addition of high amounts of water to the powder in order to dilute the product. It can then be consumed in such manner, with a relatively low viscosity of approximately 50 centipoise at water content of 5:1 parts of fine grind. The addition of cocoa and other flavorings can produce a final product which is suited to a given taste preference, such as chocolate milk, strawberry flavoring, peach, berry, and even coffee or tea flavoring.

The present invention as above-described provides the following features, advantages and benefits:

A traditional cereal made for human consumption with a formulation containing high amounts of proteins from single or various sources, thus giving a harder texture to the traditional cereal and making the final product less absorbent to water. The total protein content of the cereal can be from 1–38% based on the dry weight.

A coated cereal with an adhesive to cause the powder or the liquid being applied to the surface to hold onto the abundant amount of compounds needed to color the water added to the product, which will mix and dissolve in water giving the appearance, texture and taste as well as color of milk, and will contain enough compounds necessary to add a milk-like flavor and mouth-feel to the total cereal during consumption, wherein the coated cereal will provide a complete nutritional balance for the consumer based on the consumption of regular cereal and milk.

A cereal with the consistency of cereal in milk, in color, or flavor, or mouth-feel, or all or some of the above characteristics when water is added to the cereal in the bowl.

A cereal in water which can be used as a nutritional food for humans and infants because the coating can contain additional vitamins and minerals to fit the specified target.

A cereal which maintains its texture in water and releases the water-soluble coating into the water within a very short time of a few seconds to a few minutes.

A coated cereal that can be heat treated after water is added to the bowl in order to produce a porridge that is high in nutrition and soft in texture and high in proteins, vitamins and/or minerals.

A product which can be ground to powder and used as a food supplement and/or complete nutritional food for diets.

A specific cereal coated with a soya milk base incorporating vitamins and minerals, whiteners, and adhering agents for those who are lactose intolerant.

A coated cereal that can be formulated in such a manner that it can be considered full-fat, low-fat, or no-fat, resulting in a cereal with a milk-like coating which is full-, low-, or no fat content.

Other flavorings and colorants, natural or artificial, may be added to produce a final product which becomes cereal in milk with cocoa or various fruits, such as strawberry, peach, or other sources/flavors such as coffee, tea or shakes, as well as candy flavorings such as bubble gum, candy cane, candy apple, and the like.

We claim:

1. A coated cereal product comprising:

a dry cereal having a coating;

said coating comprising:

an effective amount of a water soluble adhesive, and an effective amount of a water soluble powder consisting of powdered soya milk, protein sources and mixtures thereof, wherein the coated cereal product mimics the appearance and taste of milk with cereal when cold water is added thereto, and wherein the coated product provides a complete nutritional balance on consumption and has a protein content from about 1 to 38% based on the dry weight.

2. The product of claim 1, wherein the coating comprises:

from about 0.5 to 1.5 wt-% of the adhesive, based on the total cereal product; and from about 1 to 15 wt-% of the water soluble powder.

3. The product of claim 1, wherein the dry cereal has a protein content of at least 12% based on the dry weight.

4. The product of claim 1 wherein the adhesive is a water soluble member selected from the group consisting of maltodextrin, sodium alginates, propylene glycol alginates, guar gum, locust bean gum, gum arabic, pectin, kappa carageenan, carboxymethylcellulose, methylcellulose, hydroxypropyl methylcellulose, xanthan, hydrocolloids, and mixtures thereof.

5. The product of claim 1, wherein the adhesive is a sugar or syrup.

6. The product of claim 5, wherein the adhesive is corn syrup.

7. The product of claim 1, wherein the coating further comprises vitamins, minerals, colorants, flavorings, and mixtures thereof.

8. The product of claim 1, wherein the water activity of the coated cereal is less than 5.2 Aw.

9. The product of claim 1, wherein the coating comprises from about 0.5 to 1.5 wt-% water soluble adhesive, and from about 1 to 15 wt-% of a powdered soya milk and non-dairy protein sources.

10. The product of claim 1, wherein the dry cereal comprises:

1–28 wt-% protein;

1–20 wt-% sugars;

30–85 wt-% carbohydrates;

0.5–8 wt-% fats; and 0.5–16 wt-% fibers.

11. The product of claim 1, wherein the coating further comprises an amount of fat sufficient to mimic a low-fat or full-fat cereal and milk when water is added to the cereal product.

12. A food supplement comprising the coated cereal of claim 1 in ground or powder form.

* * * * *